US008130466B2

(12) United States Patent
Nagata (10) Patent No.: US 8,130,466 B2
(45) Date of Patent: Mar. 6, 2012

(54) DISK DRIVE AND MAGNETIC CIRCUIT FIXING METHOD FOR THE SAME

(75) Inventor: Hiroshi Nagata, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 561 days.

(21) Appl. No.: 12/331,695

(22) Filed: Dec. 10, 2008

(65) Prior Publication Data

US 2009/0296261 A1 Dec. 3, 2009

(30) Foreign Application Priority Data

Apr. 30, 2008 (JP) ................................. 2008-119140

(51) Int. Cl.
*G11B 17/00* (2006.01)
*G11B 33/14* (2006.01)
(52) U.S. Cl. ............... 360/97.01; 360/97.02; 360/97.03; 360/97.04
(58) Field of Classification Search ................... 360/75, 360/97.01, 97.02, 97.03, 97.04, 98.01, 98.02, 360/98.07, 99.01, 99.04, 99.09, 99.11
See application file for complete search history.

(56) References Cited

U.S. PATENT DOCUMENTS

| 4,899,237 | A | * | 2/1990 | Tochiyama et al. | ........ | 360/98.02 |
|---|---|---|---|---|---|---|
| 5,084,793 | A | * | 1/1992 | Ishida et al. | ............... | 360/97.02 |
| 5,109,310 | A | * | 4/1992 | Ohkjita et al. | ............. | 360/97.01 |
| 5,673,159 | A | * | 9/1997 | Jinbo et al. | .................. | 360/98.01 |
| 6,266,207 | B1 | * | 7/2001 | Iwahara et al. | ............ | 360/97.02 |
| 6,373,654 | B1 | * | 4/2002 | Iwahara et al. | ............ | 360/97.01 |
| 6,690,532 | B1 | * | 2/2004 | Choo et al. | ....................... | 360/75 |
| 6,965,492 | B2 | * | 11/2005 | Obata et al. | ................ | 360/99.08 |
| 7,729,082 | B2 | * | 6/2010 | Ang et al. | .................. | 360/97.01 |
| 2008/0024909 | A1 | | 1/2008 | Ang et al. | | |

FOREIGN PATENT DOCUMENTS

| JP | 02-281433 | 11/1990 |
|---|---|---|
| JP | 8-167259 | 6/1996 |
| JP | 2000-149396 | 5/2000 |
| JP | 2001-035129 | 2/2001 |
| JP | 2002-319147 | 10/2002 |
| JP | 3091683 | 11/2002 |
| JP | 2003-123232 | 4/2003 |
| JP | 2007-200426 | 8/2007 |
| JP | A 2007-292221 | 11/2007 |

OTHER PUBLICATIONS

Notice of Reasons for Rejection issued in corresponding Japanese App. No. 2008-119140, mailed Nov. 8, 2011 (with translation).

* cited by examiner

*Primary Examiner* — Trong Phan
(74) *Attorney, Agent, or Firm* — Greer, Burns & Crain, Ltd.

(57) ABSTRACT

A disk-drive magnetic circuit fixing structure and fixing method for fixing a magnetic circuit to a base by means of a plurality of screws, wherein provisions are made to substantially prevent a microscopic sliding movement involving impulsive vibration from occurring at a fastening portion between the magnetic circuit and the base. More specifically, in a disk drive including a disk enclosure having a base and a cover, a magnetic head contained within the disk enclosure, and a driving coil motor for driving the magnetic head by working in combination with an actuator on which the magnetic head is mounted and a magnetic circuit disposed in the vicinity of the actuator, the magnetic circuit is fixed to the base with a single or a plurality of screws by applying in advance a lubricant forming a lubricating layer on a face where each screw contacts the magnetic circuit or the base.

5 Claims, 7 Drawing Sheets

RELATIONSHIP BETWEEN FRICTION COEFFICIENT AND
FASTENING FORCE OF SCREW $$F = \frac{2T}{P/\pi + \tan\rho \times d1 \times \mu 1 + d2 \times \mu 2}$$

F ⋯ FASTENING FORCE
T ⋯ TIGHTENING TORQUE
P ⋯ SCREW PITCH
$\rho$ ⋯ FRICTION ANGLE
d1 ⋯ EFFECTIVE DIAMETER OF MALE THREAD
d2 ⋯ EQUIVALENT DIAMETER OF FRICTION TORQUE AT NUT SEATING FACE
$\mu 1$ ⋯ FRICTION COEFFICIENT AT THREAD FACE
$\mu 2$ ⋯ FRICTION COEFFICIENT AT NUT SEATING FACE $\mu 1$ AND $\mu 2$ ARE REDUCED
(SCREW DIAMETER, SCREW PITCH, AND
TIGHTENING TORQUE ARE UNCHANGED)

F INCREASES

DISK DRIVE AND MAGNETIC CIRCUIT FIXING METHOD FOR THE SAME

CROSS-REFERENCE TO RELATED APPLICATIONS

This application is based upon and claims the benefit of priority of the prior Japanese Patent Application No. 2008-119140, filed on Apr. 30, 2008, the entire contents of which are incorporated herein by reference.

FIELD

The embodiments disclosed herein are directed to a disk-drive magnetic circuit fixing structure and a disk-drive magnetic circuit fixing method for fixing a magnetic circuit to a base, by means of a plurality of screws, when assembling a disk drive having a construction such that a magnetic head that performs reading and writing of information on a rotating disk, and a driving coil motor (for example, a voice coil motor (VCM)) that drives the magnetic head so as to move the magnetic head to a designated position on the disk by working in combination with an actuator on which the magnetic head is mounted and a magnetic circuit disposed in the vicinity of the actuator, are contained within a disk enclosure having a base and a cover.

BACKGROUND

Generally, in an assembly process of a disk drive such as a hard disk drive (i.e., a magnetic disk drive, usually abbreviated as HDD), a disk such as a magnetic disk is mounted on the hub portion of a spindle, while a magnetic circuit and an actuator constituting a driving coil motor such as a voice coil motor are mounted on the base of a disk enclosure. The term "actuator" used here refers to a component element that includes a head support (head suspension) on which a magnetic head is held and a flat coil formed on the side of the head support opposite to the magnetic head. In some cases, the actuator may includes the magnetic circuit.

To describe in further detail, the magnetic circuit includes an upper magnet and upper magnetic yoke disposed above the actuator, a lower magnet and lower magnetic yoke disposed under the actuator, and a magnetic circuit connecting portion magnetically connecting between the upper magnetic yoke and the lower magnetic yoke. Generally, the upper magnetic yoke, the lower magnetic yoke, and the magnetic circuit connecting portion are fabricated from a magnetic metal such as iron to provide a path for the magnetic flux produced by the magnetic field arising from the upper and lower magnets. On the other hand, the base of the disk enclosure is usually fabricated from a nonmagnetic metal such as aluminum. In other words, the magnetic circuit and the base are respectively fabricated from dissimilar metals.

In a prior art disk drive assembly process, the magnetic circuit is fixed to the base by fastening the former (in particular, the lower magnetic yoke portion) to the latter by means of a plurality of screws. The fastening of such dissimilar metals is accomplished by forcefully fastening together the dissimilar metals by the screws. The thermal expansion coefficient of the base formed from aluminum (about $21 \times 10^{-6}$ °C.$^{-1}$) is typically about twice that of the magnetic circuit formed from iron (about $12 \times 10^{-6}$ °C.$^{-1}$). When the ambient temperature, etc., change, the base tries to expand about twice as much as the magnetic circuit; however since the base and the magnetic circuit are forcefully fastened together by the screws, the base can only expand by the same amount as the magnetic circuit.

As a result, the magnetic circuit compresses the base because of the difference in thermal expansion coefficient between the dissimilar metals, causing stress in the shearing direction at the fastening portion of the dissimilar metals. If this shearing stress becomes greater than the retaining force acting in the shearing direction at the screw-fastened portion, a microscopic sliding movement (also called stick-slip) occurs at the fastened portion. Since such a microscopic sliding movement occurs by involving impulsive vibration, the head position of the magnetic head fluctuates due to the impulsive vibration, and the on-track performance of the magnetic head degrades, resulting in the problem that the magnetic head cannot be positioned stably over the target track on the disk.

For reference purposes, Japanese Unexamined Patent Publication No. 2007-292221 (hereinafter called Patent Document 1) will be presented below as a document related to the prior art.

In Patent Document 1, there is disclosed a structure for use in a recording media drive having a first component (spindle hub) provided with a threaded hole, a second component (clamp) that contacts the first component, and a clamping screw that is screwed into the threaded hole of the first component to fix the second component to the first component, the structure being such that, when clamping the components together by screwing the clamping screw into the threaded hole of the spindle motor of the recording media drive, a lubricating film is formed between the threaded hole and the clamping screw so as to reduce the frictional force between the threaded hole and the clamping screw, thereby providing an increased axial force (the clamping force in the axial direction) without increasing the clamping torque of the clamping screw.

However, in Patent Document 1, no mention whatsoever is made of specific techniques for suppressing the occurrence of a microscopic sliding movement involving impulsive vibration at the fastening portion of the dissimilar metals due to the shearing stress occurring at the fastening portion because of the difference in thermal expansion coefficient between the first component (spindle hub) and the second component (clamp).

Accordingly, with the structure disclosed in Patent Document 1, it is not possible to address the problem that arises when a microscopic sliding movement involving impulsive vibration occurs because of the difference in thermal expansion coefficient between the magnetic circuit and the base when fixing the magnetic circuit to the base in accordance with the prior art.

It is therefore desired to provide a disk-drive magnetic circuit fixing structure and a magnetic circuit fixing method that can suppress the occurrence of a microscopic sliding movement involving impulsive vibration at the fastening portion between the magnetic circuit in the disk drive and the base of the disk enclosure, for example, when the thermal expansion coefficient of the magnetic circuit differs from that of the base.

SUMMARY

According to one aspect of the techniques disclosed herein, there is provided a disk drive which includes: a disk enclosure having a base and a cover; a magnetic head, contained within the disk enclosure, for reading and writing information on an information storage disk; a driving coil motor for driving the magnetic head so as to move the magnetic head to a designated position on the disk by working in combination with an actuator on which the magnetic head is mounted and a magnetic circuit disposed in the vicinity of the actuator; and a magnetic circuit fixing structure for fixing the magnetic circuit to the base by means of at least one screw, wherein a lubricant is applied at least to a face where the screw contacts the magnetic circuit or the base.

Preferably, in the magnetic circuit fixing structure, the magnetic circuit and the base are respectively fabricated from dissimilar metals, and even when the thermal expansion coefficient of the magnetic circuit differs from that of the base, the sliding movement between the magnetic circuit and the base is suppressed.

Further preferably, in the magnetic circuit fixing structure, the magnetic circuit includes an upper magnet and upper magnetic yoke disposed above the actuator, a lower magnet and lower magnetic yoke disposed under the actuator, and a magnetic circuit connecting portion magnetically connecting between the upper magnetic yoke and the lower magnetic yoke.

Further preferably, in the magnetic circuit fixing structure, the lubricant is a lubricant used for precoating the disk in order to prevent the formation of gases inside the disk.

According to an alternative embodiment, there is provided a disk which includes: a disk enclosure having a base and a cover; a magnetic head, contained within the disk enclosure, for reading and writing information on an information storage disk; a driving coil motor for driving the magnetic head so as to move the magnetic head to a designated position on the disk by working in combination with an actuator on which the magnetic head is mounted and a magnetic circuit disposed in the vicinity of the actuator; and a magnetic circuit fixing structure for fixing the magnetic circuit to the base by means of at least one screw, wherein a resin layer (resin material) with an adhesive layer formed thereon is inserted between the magnetic circuit and the base.

Preferably, in the magnetic circuit fixing structure according to the alternative embodiment, the magnetic circuit and the base are respectively fabricated from dissimilar metals, and even when the thermal expansion coefficient of the magnetic circuit differs from that of the base, the sliding movement between the magnetic circuit and the base is suppressed.

Further preferably, in the magnetic circuit fixing structure according to the alternative embodiment, the magnetic circuit includes an upper magnet and upper magnetic yoke disposed above the actuator, a lower magnet and lower magnetic yoke disposed under the actuator, and a magnetic circuit connecting portion magnetically connecting between the upper magnetic yoke and the lower magnetic yoke.

Further preferably, in the magnetic circuit fixing structure according to the alternative embodiment, the adhesive layer is formed on the resin layer except a portion thereof that overlaps the magnetic circuit connecting portion of the magnetic circuit.

According to another aspect of the techniques disclosed herein, there is provided, for use in a disk drive comprising a disk enclosure having a base and a cover, a magnetic head, contained within the disk enclosure, for reading and writing information on an information storage disk, and a driving coil motor for driving the magnetic head so as to move the magnetic head to a designated position on the disk by working in combination with an actuator on which the magnetic head is mounted and a magnetic circuit disposed in the vicinity of the actuator, a disk-drive magnetic circuit fixing method for fixing the magnetic circuit to the base by means of at least one screw, the method including: applying a lubricant in advance at least to a face where the screw contacts the magnetic circuit or the base; and fixing the magnetic circuit to the base by the screw.

According to an alternative embodiment, there is provided, for use in a disk drive comprising a disk enclosure having a base and a cover, a magnetic head, contained within the disk enclosure, for reading and writing information on an information storage disk, and a driving coil motor for driving the magnetic head so as to move the magnetic head to a designated position on the disk by working in combination with an actuator on which the magnetic head is mounted and a magnetic circuit disposed in the vicinity of the actuator, a disk-drive magnetic circuit fixing method for fixing the magnetic circuit to the base by means of at least one screw, the method including: inserting a resin layer with an adhesive layer formed thereon between the magnetic circuit and the base; and fixing the magnetic circuit to the base by the screw.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Preferred embodiments of the present invention will be explained with reference to accompanying drawings.

Figure 1:
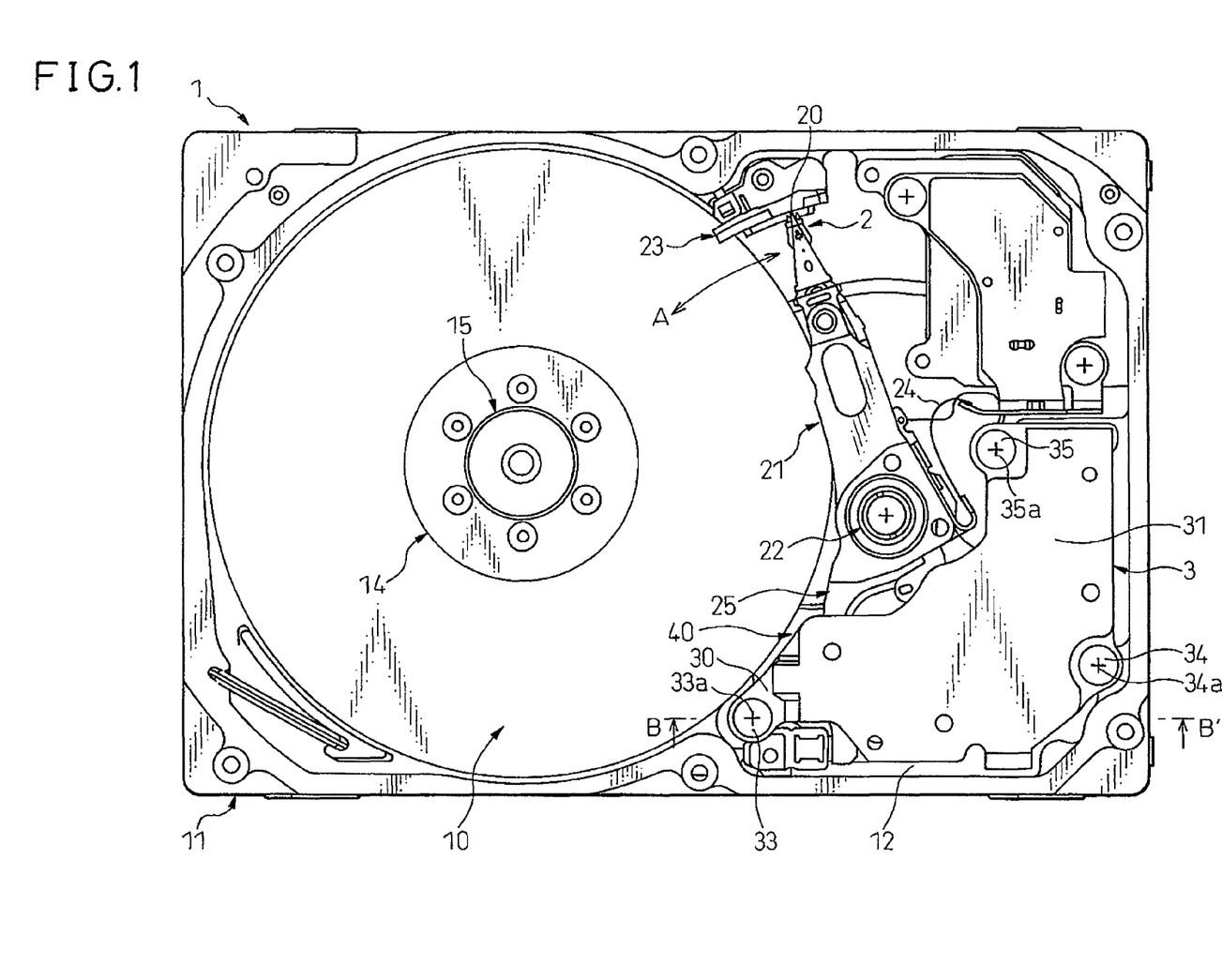
FIG. 1 is a plan view showing the entire construction of a disk drive according to the embodiments disclosed herein.
Figure 2:
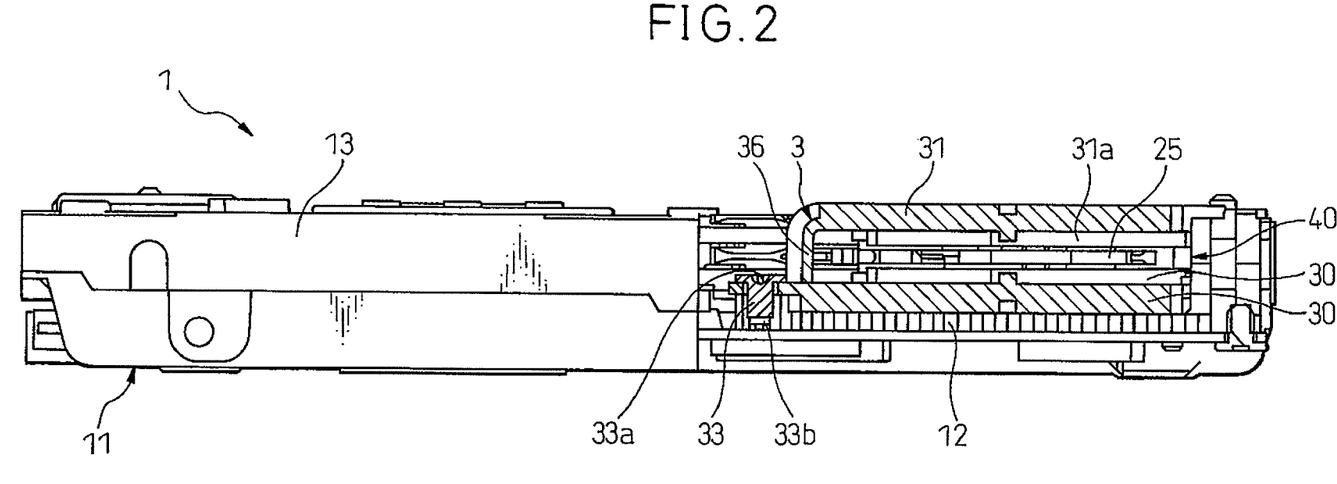
FIG. 2 is a cross-sectional view of the disk drive taken along line B-B' in FIG. 1.

FIG. 1 is a plan view showing the entire construction of a disk drive according to the embodiments disclosed herein, and FIG. 2 is a cross-sectional view of the disk drive taken along line B-B' in FIG. 1. In the cross-sectional view of FIG. 2, only the portion of the disk drive that contains a magnetic circuit 3 and an actuator is shown in cross section along line B-B', with the cover 13 of the disk enclosure 11 removed.

Throughout the drawings given herein, like component elements are designated by like reference numerals.

A disk drive 1 equipped with a magnetic head 2 for reading and writing information on a disk 10, a rotating recording medium such as a magnetic disk, is shown as an example of the disk drive according to the embodiments of the present invention.

The disk drive 1 shown in FIGS. 1 and 2 roughly comprises mechanical components such as the disk 10, magnetic head 2, spindle motor 15, voice coil motor (driving coil motor) 40, etc. contained within the disk drive, and a control unit (not shown in FIGS. 1 and 2) which controls various operations such as the data read/write operations of the magnetic head 2.

The disk drive 1 includes the disk enclosure 11 which forms a housing space, substantially rectangular in shape, for housing the various mechanical components therein. The disk enclosure 11 includes a base 12 placed in the lower part and the cover 13 which is placed in the upper part and joined to the base 12. Preferably, the base 12 is produced by casting a nonmagnetic metal such as aluminum. On the other hand, the cover 13 is produced by press-forming a single plate such as aluminum. The housing space is hermetically sealed with the base 12 and cover 13 joined together.

In the housing space formed between the base 12 and cover 13, the disk 10, or more specifically, one or more magnetic disks that are driven for rotation by the spindle motor 15 connected to a spindle 14, are mounted on a common axis. The operation of the spindle motor 15 is controlled by a servo controller in the control unit. The spindle motor 14 can rotate the disk 10 at high speed, for example, at 5400 rpm, 7200 rpm, 10000 rpm, or 15000 rpm.

On the media surface (or media back surface) forming the magnetic recording surface of the disk 10, there are formed a plurality of tracks in concentric circles from the inner diameter to the outer diameter of the magnetic recording surface. A data pattern corresponding to data is written to a designated sector in a given track.

The magnetic head 2 for writing data to a designated position on a given track on the magnetic recording surface of the disk 10, and for reading data recorded in a designated position on a given track on the magnetic recording surface, is also contained within the housing space formed between the base 12 and cover 13. The magnetic head 2 is mounted on a slider 20 attached to the forward end of the head support 21 that holds the magnetic head 2. The head support 21 is driven by the voice coil motor 40 under control of the servo controller in the control unit in such a manner as to move back and forth over the plurality of tracks between the inner diameter and the outer diameter of the disk 10. The magnetic head 12 can thus access any sector in any data storing region on the magnetic recording surface of the disk 10. A pivot bearing 22 is provided in the center of the voice coil motor 40 to facilitate smooth back-and-forth motion of the head support 21.

Near the outer diameter of the disk 10, there is provided a ramp mechanism 23 which engages with the slider 20 attached to the forward end of the head support 21 and holds the magnetic head 2 away from the disk 10.

For example, by turning the head support 21 in the direction of arrow A by means of the voice coil motor 40, the magnetic head 2 can be moved radially over the disk 10 to access the desired track. A flexible printed circuit board (usually abbreviated as FPC) 24 is attached to the voice coil motor 40, and a servo signal for controlling the operation of the voice coil motor 40 and the magnetic head 2 is supplied from the servo controller via the flexible printed circuit board 24.

In the assembly process of the disk drive 1, the disk 10 is mounted on the hub portion of the spindle 14, while the magnetic circuit 3 and the actuator constituting the voice coil motor 40 are mounted on the base 12 of the disk enclosure 11. The term "actuator" used here refers to a component element that includes the head support 21 on which the magnetic head 2 is held and the flat coil 25 formed on the side of the head support 21 opposite to the magnetic head 2. In some cases, the magnetic circuit 3 disposed in the vicinity of the actuator may be included in the actuator.

The construction of the magnetic circuit 3 and the structure of the fastening portion between the magnetic circuit 3 and the base 12 according to the embodiments of the present invention will be described in detail below. As shown in FIGS. 1 and 2, the magnetic circuit 3 includes an upper magnet 31a and upper magnetic yoke 31 disposed in close proximity to the upper part of the flat coil 25, a lower magnet 30a and lower magnetic yoke 30 disposed in close proximity to the lower part of the flat coil 25, and magnetic circuit connecting portions (side yokes) 36 to 38 (see FIG. 3 to be described later) magnetically connecting between the upper magnetic yoke 31 and the lower magnetic yoke 30. The upper magnetic yoke 31 and the lower magnetic yoke 30 are each formed in a curved shape so as to conform to the moving range of the flat coil 25. Further, the upper magnetic yoke 31 and the lower magnetic yoke 30 are magnetically connected by the magnetic circuit connecting portions 36 to 38 while maintaining a prescribed gap between the upper and lower magnetic yokes. The voice coil motor 40 is constructed by incorporating the flat coil 25 so as to be movable within the gap provided between the upper magnet 31a and upper magnetic yoke 31 and the lower magnet 30a and lower magnetic yoke 30 in the magnetic circuit 3 formed by the upper magnetic yoke 31, the lower magnetic yoke 30, the magnetic circuit connecting portions 36 to 38, etc. The upper magnetic yoke 31, the lower magnetic yoke 30, and the magnetic circuit connecting portions 36 to 38 are fabricated from a magnetic metal such as iron to provide a path for the magnetic flux produced by the magnetic field arising from the upper and lower magnets 31a and 30a.

The base 12 of the disk enclosure 11 in FIGS. 1 and 2 is fabricated from a nonmagnetic metal such as aluminum, as previously described. Therefore, the magnetic circuit 3 and the base 12 are respectively fabricated from dissimilar metals.

Further, as shown in FIGS. 1 and 2, the magnetic circuit 3 is fixed to the base 12 by fastening the lower magnetic yoke 30 of the magnetic circuit 3 to the base 12 with one or more screws 33 to 35 (in FIG. 1, three screws 33 to 35 are shown, while in FIG. 2, only one screw 33 is shown).

To describe in further detail, the screw 33 which has a recessed portion 33a is located at a first edge portion of the lower magnetic yoke 30 of the magnetic circuit 3. Further, a positioning hole 33b for positioning the screw 33 is formed in the bottom part of the threaded hole into which the screw 33 is screwed. On the other hand, the screw 34 which has a recessed portion 34a is located at a second edge portion of the lower magnetic yoke 30 of the magnetic circuit 3, and the screw 35 which has a recessed portion 35a is located at a third edge portion of the lower magnetic yoke 30 of the magnetic circuit 3. The recessed portions 33a to 35a are used to apply a suitable tightening torque to the respective screws 33 to 35 when driving them by a screwdriver or the like to fix the magnetic circuit 3 to the base 12. Though not shown in FIG. 2, it will be appreciated that the positioning holes for positioning the screws 34 and 35 are formed in the bottom parts of the threaded holes into which the respective screws 34 and 35 are screwed.

Figure 6:
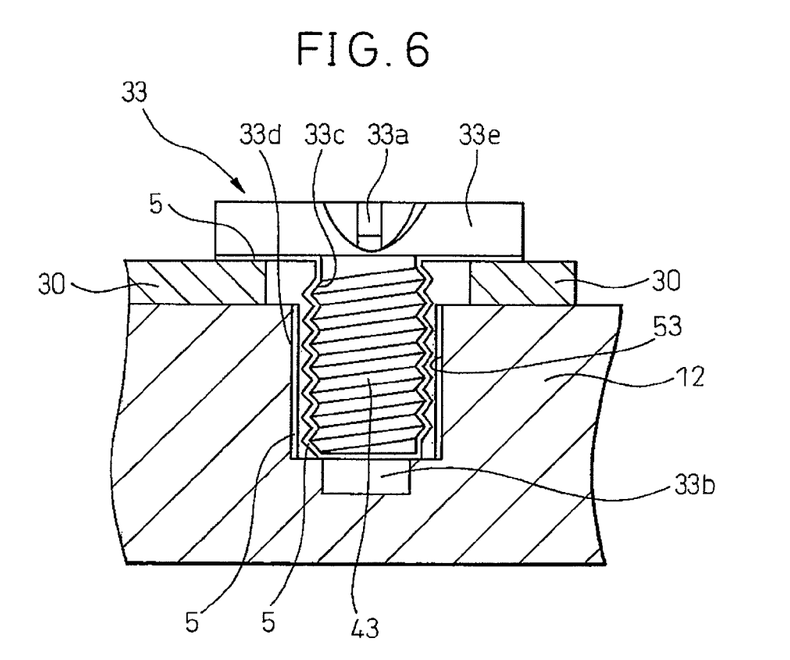
FIG. 6 is a cross-sectional view showing a first example of the disk-drive magnetic circuit fixing structure according to the embodiments of the present invention by enlarging a portion thereof.

As shown in the embodiment of FIG. 6 to be described later, in a first example of the disk-drive magnetic circuit fixing structure according to the embodiments of the present invention, before fixing the magnetic circuit 3 to the base 12 with one or more screws 33 to 35, a lubricating layer is formed by applying a lubricant to the face where each of the screws 33 to 35 contacts the magnetic circuit 3 or the base 12.

Figure 8:
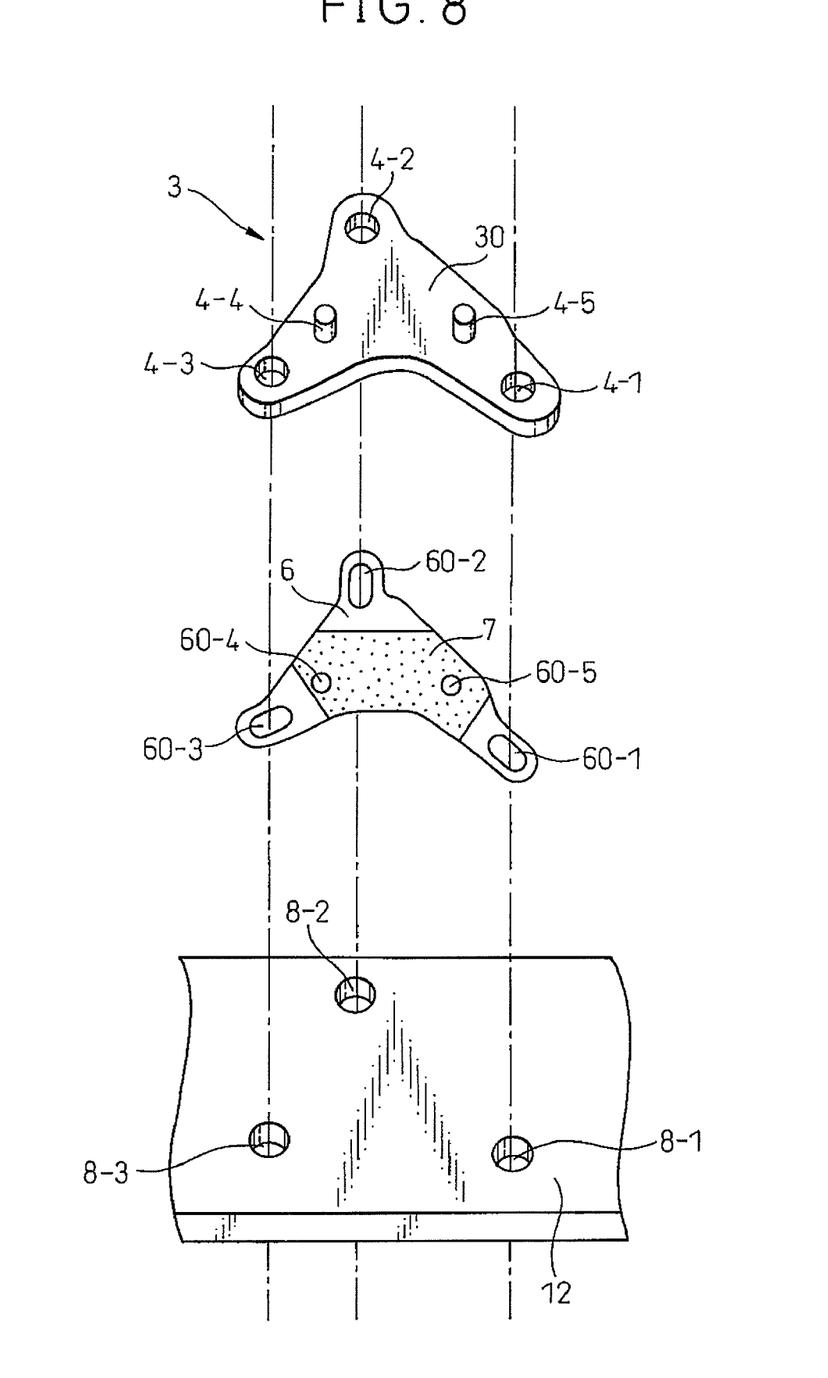
FIG. 8 is an exploded perspective view showing a second example of the disk-drive magnetic circuit fixing structure according to the embodiments of the present invention by enlarging a portion thereof.

As shown in the embodiment of FIG. 8 to be described later, in a second example of the disk-drive magnetic circuit fixing structure according to the embodiments of the present invention, a resin layer (made of a resin material) with an adhesive layer formed thereon is sandwiched between the magnetic circuit 3 and the base 12, but the adhesive layer is not formed on the portions of the resin layer that overlap the magnetic circuit 3.

Figure 3:
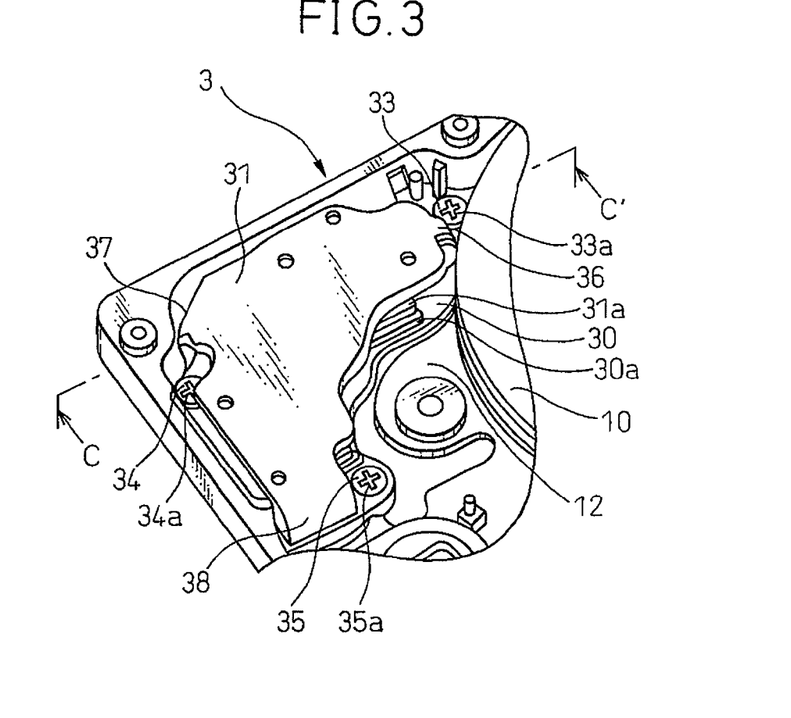
FIG. 3 is a perspective view showing the essential portion of a disk-drive magnetic circuit fixing structure to be contrasted with a disk-drive magnetic circuit fixing structure according to the embodiments of the present invention.
Figure 4:
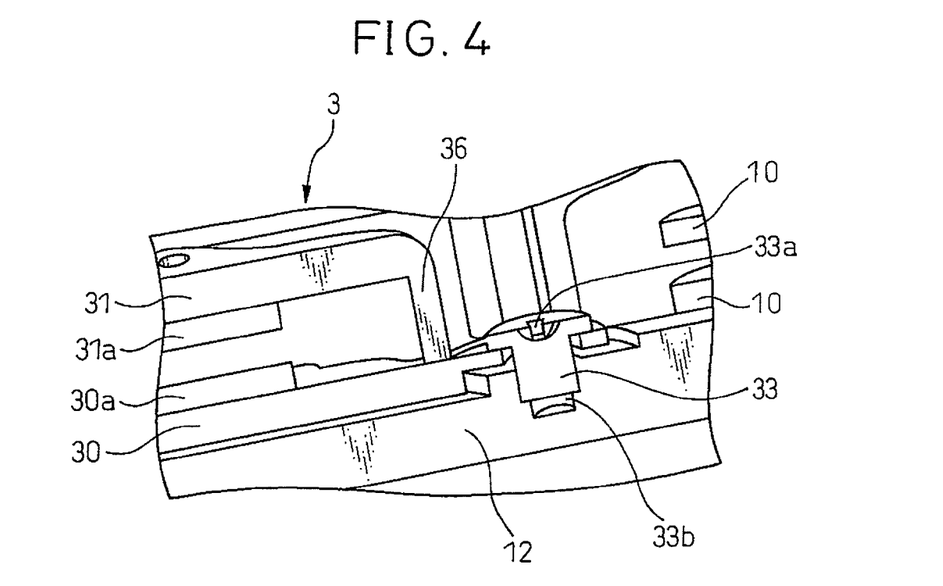
FIG. 4 is a diagram showing in cross section a portion of the disk-drive magnetic circuit fixing structure of FIG. 3.
Figure 5:
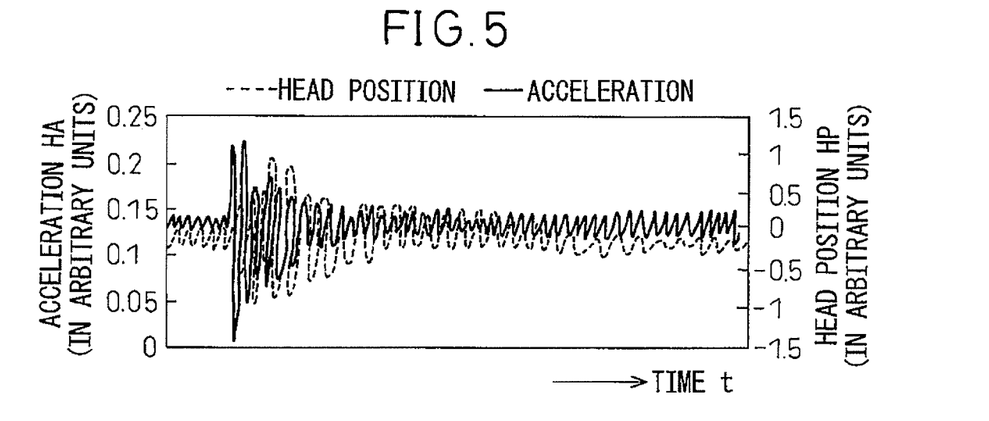
FIG. 5 is a graph showing how impulsive vibration occurs due to microscopic sliding movement occurring between a magnetic circuit and a base.

FIG. 3 is a perspective view showing the essential portion of the disk-drive magnetic circuit fixing structure to be contrasted with the disk-drive magnetic circuit fixing structure according to the embodiments of the present invention, FIG. 4 is a diagram showing in cross section a portion of the disk-drive magnetic circuit fixing structure of FIG. 3, and FIG. 5 is a graph showing how impulsive vibration occurs due to microscopic sliding movement occurring between the magnetic circuit and the base.

In the perspective view of FIG. 3, the fastening portions where the magnetic circuit 3 and the base 12 are fastened together by the plurality of screws 33 to 35 are shown as an example representing the conventional disk-drive magnetic circuit fixing structure, and in the cross-sectional view of FIG. 4, the fastening portion where the magnetic circuit 3 and the base 12 are fastened together by one screw 33 in the magnetic circuit fixing structure of FIG. 3 is shown in cross section along line C-C'.

In the magnetic circuit fixing structure of FIG. 3, the magnetic circuit 3 includes an upper magnet 31a and upper magnetic yoke 31 disposed in close proximity to the upper part of the flat coil 25 (see FIG. 2), a lower magnet 30a and lower magnetic yoke 30 disposed in close proximity to the lower part of the flat coil 25 (see FIG. 2), and magnetic circuit connecting portions 36 to 38 magnetically connecting between the upper magnetic yoke 31 and the lower magnetic yoke 30. The upper magnetic yoke 31 and the lower magnetic yoke 30 are each formed in a curved shape so as to conform to the moving range of the flat coil 25 (see FIG. 2). Further, the upper magnetic yoke 31 and the lower magnetic yoke 30 are magnetically connected by the magnetic circuit connecting portions 36 to 38 while maintaining a prescribed gap between the upper and lower magnetic yokes. The upper magnetic yoke 31, the lower magnetic yoke 30, and the magnetic circuit connecting portions 36 to 38 are fabricated from a magnetic metal such as iron to provide a path for the magnetic flux produced by the magnetic field arising from the upper and lower magnets 31a and 30a.

Further, in the magnetic circuit fixing structure of FIGS. 3 and 4, the base 12 is fabricated from a nonmagnetic metal such as aluminum, as in the case of FIGS. 1 and 2. Therefore, the magnetic circuit 3 and the base 12 are respectively fabricated from dissimilar metals.

Further, as shown in FIGS. 3 and 4, the magnetic circuit 3 is fixed to the base 12 by fastening the lower magnetic yoke 30 of the magnetic circuit 3 to the base 12 with the plurality of screws 33 to 35 (for convenience of explanation, only one screw 33 is shown in FIG. 4).

To describe in further detail, in the magnetic circuit 3 having the upper magnet 31a and upper magnetic yoke 31, the lower magnet 30a and lower magnetic yoke 30, and the magnetic circuit connecting portion 36, the screw 33 which has a recessed portion 33a is located at a first edge portion of the lower magnetic yoke 30 as shown in FIGS. 3 and 4. Further, a positioning hole 33b for positioning the screw 33 is formed in the bottom part of the threaded hole into which the screw 33 is screwed. Further, in the magnetic circuit fixing structure of FIG. 3, the screw 34 which has a recessed portion 34a is located at a second edge portion of the lower magnetic yoke 30 of the magnetic circuit 3 that includes the magnetic circuit connecting portion 37, and the screw 35 which has a recessed portion 35a is located at a third edge portion of the lower magnetic yoke 30 of the magnetic circuit 3 that includes the magnetic circuit connecting portion 38. The recessed portions 33a to 35a are used to apply a suitable tightening torque to the respective screws 33 to 35 when driving them by a screwdriver or the like to fix the magnetic circuit 3 to the base 12.

As shown in the magnetic circuit fixing structure of FIG. 4, in the conventional disk drive assembly process, the magnetic circuit 3 is fixed to the base 12 by fastening the lower magnetic yoke 30 of the magnetic circuit 3 to the base 12 by means of the disk drive assembling screw 33. The fastening of the magnetic circuit 3 to the base 12 is accomplished by forcefully fastening together the dissimilar metals by the screw, as previously described. The thermal expansion coefficient of the base 12 formed from aluminum (about $21 \times 10^{-6 \circ} \text{C}.^{-1}$), for example, is about twice that of the magnetic circuit 3 formed from iron (about $12 \times 10^{-6 \circ} \text{C}.^{-1}$). When the ambient temperature, etc., change, the base 12 tries to expand about twice as much as the magnetic circuit 3, but since the base 12 and the magnetic circuit 3 are forcefully fastened together by the screw 33, the base can only expand by the same amount as the magnetic circuit.

As a result, the magnetic circuit 3 compresses the base 12 because of the difference in thermal expansion coefficient between the dissimilar metals, causing a stress in the shearing direction at the fastening portion between the magnetic circuit 3 and the base 12. If this shearing stress becomes greater than the retaining force acting in the shearing direction at the portion fastened by the screw 33, a microscopic sliding movement occurs at the fastened portion.

The microscopic sliding movement occurring at the fastened portion is accompanied by impulsive vibration whose amplitude rapidly increases with time (t) as shown in the graph of FIG. 5. The impulsive vibration occurs because the retaining force acting in the shearing direction at the fastened portion due to the friction coefficient of the screw changes with time in such a manner that the retaining force acting in the shearing direction at the fastened portion increases and decreases with respect to the shearing stress being applied to the fastened portion due to the difference in thermal expansion coefficient between the dissimilar metals.

As can be seen from the graph of FIG. 5, the acceleration HA of the magnetic head abruptly increases upon occurrence of the impulsive vibration, and then settles down to approximately zero as the time elapses. As for the head position HP of the magnetic head, on the other hand, the amplitude of the vibration of the magnetic head rapidly increases due to the impulsive vibration, causing the head position to fluctuate, and the magnetic head will not return to its initial position even after the amplitude of the vibration has decreased. Since the head position of the magnetic head fluctuates and is displaced from its initial position due to the impulsive vibration, there arises the problem that the on-track performance of the magnetic head degrades, resulting in an inability to position the magnetic head stably over the target track on the disk.

In the conventional disk drive assembly process, this problem has been addressed by increasing the diameter of the screw or the tightening torque of the screwdriver, etc. thereby increasing the retaining force acting in the shearing direction at the fastening portion between the magnetic circuit and the base. However, due to structural limitations of the disk drive, there are portions where the diameter of the screw cannot be changed. On the other hand, when the tightening torque of the screwdriver, etc. is increased, the threaded hole may be crushed due to the increased load applied to the recessed portion of the screw.

Specific examples of the disk-drive magnetic circuit fixing structure according to the embodiments of the present invention for addressing the above problem will be described below with reference to FIGS. 6 to 8.

Figure 7:
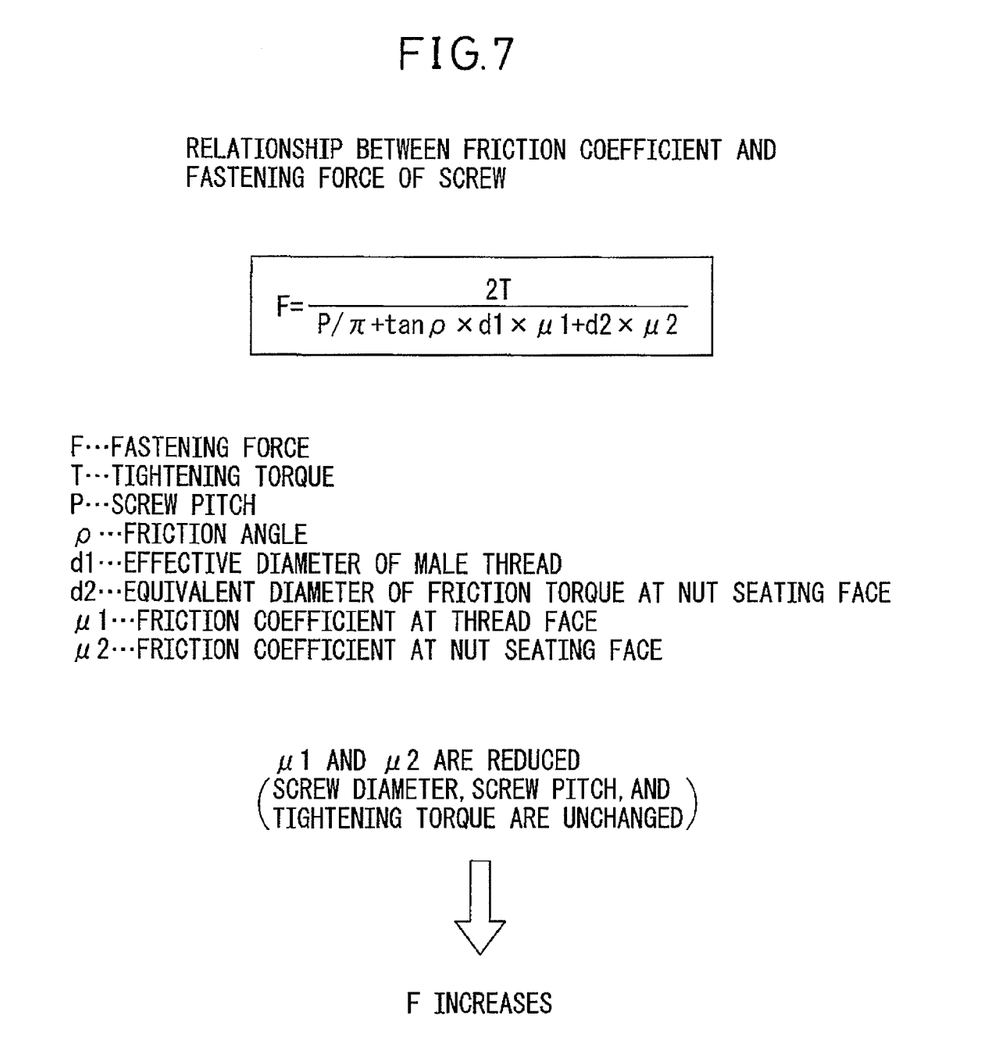
FIG. 7 is a diagram showing the relationship between screw friction coefficient and screw fastening force.

FIG. 6 is a cross-sectional view showing the first example of the disk-drive magnetic circuit fixing structure according to the embodiments of the present invention by enlarging a portion thereof, and FIG. 7 is a diagram showing the relationship between the friction coefficient and the fastening force of the screw. In the cross-sectional view of FIG. 6, the portion where the magnetic circuit 3 is fastened to the base 12 by the screw 33 in FIG. 2 is shown in enlarged detail.

In the first example of the magnetic circuit fixing structure shown in FIG. 6, a lubricating layer is formed by applying in advance a lubricant 5 to the face where the screw head 33e of the screw 33 having the recessed portion 33a contacts the lower magnetic yoke 30 as well as to the face where a male thread 43 on which a thread face 33c is formed (and which has a positioning hole 33b) contacts a threaded hole (female thread) 53 on which a thread face 33d is formed within the base 12. For example, a lubricant may be applied to the whole screw 33 in advance.

A mathematical equation that defines the relationship between the friction coefficient of the screw (for example, the screw 33) and the fastening force of the screw is shown for reference purposes. In the mathematical equation of FIG. 7, F, T, and P represent the fastening force of the screw, the tightening torque, and the screw pitch, respectively. Further, $\rho$, d1, d2, $\mu 1$, and $\mu 2$ represent the friction angle, the effective diameter of the male thread, the equivalent diameter of the friction torque at the nut seating face (or the face where the screw head contacts the lower magnetic yoke), the friction coefficient at the thread face, and the friction coefficient at the nut seating face (or the face where the screw head contacts the lower magnetic yoke), respectively.

As can be seen from the mathematical equation of FIG. 7, the fastening force F of the screw increases as the friction coefficient, $\mu 1$, at the thread face of the screw 33 or the friction coefficient, $\mu 2$, at the face where the screw head contacts the lower magnetic yoke decreases. In the first example of the magnetic circuit fixing structure shown in FIG. 6, by reducing the friction coefficient of the screw 33 using the lubricating layer formed by applying the lubricant 5, the fastening force F of the screw is increased without changing the effective diameter d1 of the male thread, the equivalent diameter d2 of the friction torque at the face where the screw head contacts the lower magnetic yoke, the screw pitch P, the tightening torque T, etc.

In the first example of FIG. 6, when the fastening force F of the screw is increased, the retaining force acting in the shearing direction at the fastening portion between the magnetic circuit 3 and the base 12 becomes greater than the stress occurring in the shearing direction at the fastening portion of the dissimilar metals, and as a result, the microscopic sliding movement involving the impulsive vibration can be substantially prevented from occurring at the fastening portion. This serves to prevent the on-track performance of the magnetic head from degrading with the head position of the magnetic head fluctuating due to the impulsive vibration, and thus the magnetic head can be positioned stably over the target track on the disk.

Preferably, a lubricant commonly used for media precoating, for example, tetraol (registered trademark) used to precoat the disk 10 (see FIG. 1) in order to prevent the formation of gases inside the disk 10 (see FIG. 1), is chosen as the lubricant 5 to be used in the first example of FIG. 6. More preferably, a fluorine-based lubricant prepared by mixing tetraol (registered trademark) and veltre (registered trademark) is chosen.

FIG. 8 is an exploded perspective view showing the second example of the disk-drive magnetic circuit fixing structure according to the embodiments of the present invention by enlarging a portion thereof. In the exploded perspective view of FIG. 8, the portion where the lower magnetic yoke 30, the resin layer (resin material) 6, and the base 12 are placed one on top of another to fasten the magnetic circuit 3 to the base 12 in FIG. 2 is shown in enlarged detail.

In the conventional disk drive, there is disclosed a structure in which a resin layer (made of a polyimide resin or the like) having an adhesive layer is sandwiched between the upper magnetic yoke of the magnetic circuit and the cover of the disk enclosure. However, in the conventional disk drive, since the magnetic circuit is directly fixed to the base, the above structure is not effective in preventing the microscopic sliding movement involving impulsive vibration from occurring at the fastening portion between the magnetic circuit and the base.

In contrast, in the second example of the disk-drive magnetic circuit fixing structure shown in FIG. 8, the resin layer 6 with the adhesive layer 7 formed thereon is sandwiched between the lower magnetic yoke 30 of the magnetic circuit 3 and the base 12; here, the adhesive layer 7 is not formed on the portions of the resin layer 6 that overlap the magnetic circuit 3.

To describe in further detail, as shown in the second example of FIG. 8, magnetic yoke-side fixing holes 4-1 to 4-3 for fixing the lower magnetic yoke 30 to the base 12, for example, with three screws, are formed in the lower magnetic yoke 30 of the magnetic circuit 3. Further, magnetic circuit adjusting protrusions 4-4 and 4-5 for adjusting the magnetic flux passing through the magnetic circuit are formed on the lower magnetic yoke 30.

On the other hand, base-side fixing holes 8-1 to 8-3 for fixing the lower magnetic yoke 30 to the base are formed in the base 12 to correspond with the magnetic yoke fixing holes 4-1 to 4-3.

Further, screw passing holes 60-1 to 60-3 for passing, for example, three screws therethrough are formed in the resin layer 6 sandwiched between the lower magnetic yoke 30 and the base 12, to correspond with the magnetic yoke-side fixing holes 4-1 to 4-3, and magnetic circuit adjusting holes 60-4 and 60-5 are formed to correspond with the magnetic circuit adjusting protrusions 4-4 and 4-5.

In the example of FIG. 8, by inserting the resin layer 6 having the adhesive layer 7 formed thereon, the magnetic circuit 3 and the base 12 can be caused to slide smoothly at the fastening portion between the magnetic circuit 3 and the base 12, thus substantially preventing the microscopic sliding movement involving the impulsive vibration from occurring at the fastening portion between the magnetic circuit 3 and the base 12. Here, since the adhesive layer 7 is not formed on the portions of the resin layer 6 that overlap the magnetic circuit connecting portions of the magnetic circuit 3, the mounting accuracy of the magnetic circuit 3 does not drop when fixing the magnetic circuit 3 to the base 12 via the adhesive layer 7, and the performance of the disk drive can thus be prevented from degrading.

Preferably, for the resin layer 6 used in the second example of FIG. 8, a resin material such as a polyimide resin, a PET (polyethylene tetraphthalate) resin, or Teflon (registered trademark) is used. Alternatively, the earlier described media precoating lubricant may be used instead.

Figure 9A:
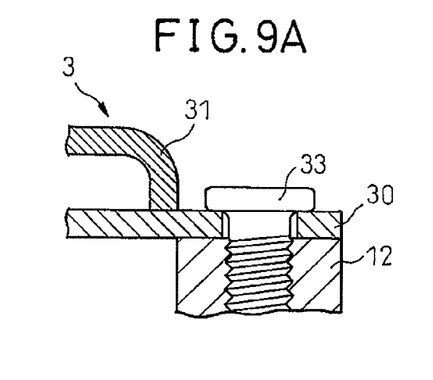
FIGS. 9A to 9F are cross-sectional views showing different examples of the method of fixing the magnetic circuit to the base with screws.
Figure 9B:
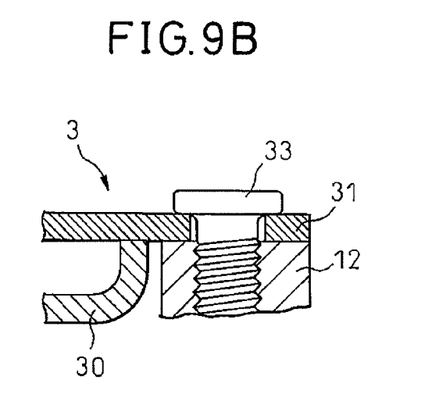
Figure 9C:
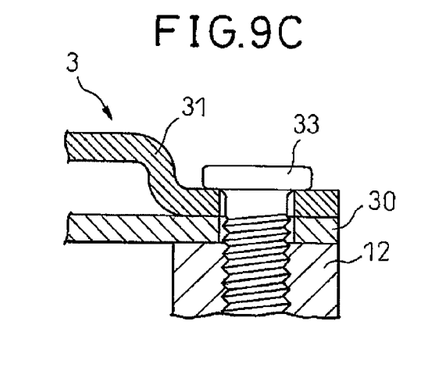
Figure 9D:
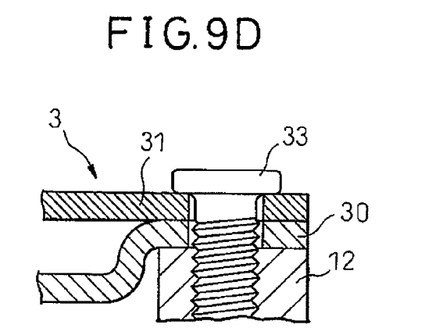
Figure 9E:
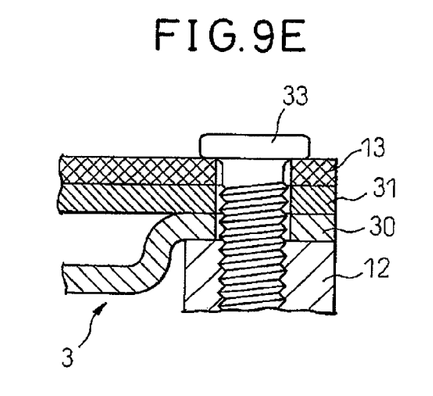
Figure 9F:
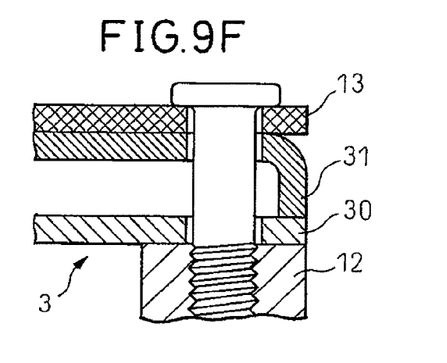

FIGS. 9A to 9F are cross-sectional views showing different examples of the method of fixing the magnetic circuit to the base with screws. In the examples of FIGS. 6 and 8, the lower magnetic yoke 30 of the magnetic circuit 3 is fastened to the base 12 with screws (for example, screw 33), as shown in FIG. 9A. However, in order to fix the magnetic circuit to the base, the upper magnetic yoke 31 of the magnetic circuit 3 may be fastened to the base 12 with screws (for example, screw 33), as shown in FIG. 9B. Alternatively, both the lower and upper magnetic yokes 30 and 31 of the magnetic circuit 3 may be fastened to the base 12 with screws (for example, screw 33), as shown in FIG. 9C or 9D. Further, both the lower and upper magnetic yokes 30 and 31 of the magnetic circuit 3 may be fastened, via the cover 13 of the disk enclosure, to the base 12 with screws (for example, screw 33), as shown in FIG. 9E or 9F. The present invention is applicable to different methods of fixing the magnetic circuit to the base with screws, as shown in FIGS. 9A to 9F.

The techniques disclosed herein can be applied to various types of disk drives having a construction such that the magnetic circuit is fixed to the base with one or more screws when assembling the disk drive such as a hard disk drive.

To summarize, in the disk-drive magnetic circuit fixing structure and magnetic circuit fixing method disclosed herein, before fixing the magnetic circuit to the base with one or more screws, a lubricating layer is formed by applying a lubricant to the face where each screw contacts the magnetic circuit or the base (for example, the portion where the screw head contacts the magnetic circuit or the portion where the male thread on which a thread face is formed contacts the threaded hole on which a thread face is formed within the base), and the friction coefficient of the screw is reduced using the lubricating layer, thereby increasing the fastening force without changing the screw diameter or the screw tightening torque.

As a result, even in cases where, for example, the thermal expansion coefficient of the magnetic circuit formed from iron or the like differs from that of the base formed from aluminum or the like, since the retaining force acting in the shearing direction at the fastening portion between the magnetic circuit and the base becomes greater than the stress occurring in the shearing direction at the fastening portion of the dissimilar metals, the microscopic sliding movement involving the impulsive vibration can be substantially prevented from occurring at the fastening portion. This serves to prevent the on-track performance of the magnetic head from degrading with the head position of the magnetic head fluctuating due to the impulsive vibration, and thus the magnetic head can be positioned stably over the target track on the disk.

Furthermore, in the disk-drive magnetic circuit fixing structure and magnetic circuit fixing method disclosed herein, when fixing the magnetic circuit to the base with one or more screws, a resin layer with an adhesive layer formed thereon is inserted between the magnetic circuit and the base, with provisions made not to form the adhesive layer on the portions of the resin layer that overlap the magnetic circuit; in this way, the friction coefficient between the magnetic circuit and the base is reduced without changing the fastening force of the screw.

As a result, even in cases where, for example, the thermal expansion coefficient of the magnetic circuit formed from iron or the like differs from that of the base formed from aluminum or the like, the magnetic circuit and the base can be caused to slide smoothly at the fastening portion between the magnetic circuit and the base, thus substantially preventing the microscopic sliding movement involving the impulsive vibration from occurring at the fastening portion. This serves to prevent the on-track performance of the magnetic head from degrading with the head position of the magnetic head fluctuating due to the impulsive vibration. Furthermore, since the adhesive layer is not formed on the portions of the resin layer that overlap the magnetic circuit, the mounting accuracy of the magnetic circuit does not drop when fixing the magnetic circuit to the base via the adhesive layer, and the performance of the disk drive can thus be prevented from degrading.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A disk drive comprising:
   a disk enclosure having a base and a cover;
   a magnetic head, contained within said disk enclosure, configured to read and write information on an information storage disk;
   a driving coil motor configured to move said magnetic head to a designated position on said disk by working in combination with an actuator on which said magnetic head is mounted and a magnetic circuit disposed in the vicinity of said actuator; and
   a magnetic circuit fixing structure comprising at least one screw fastening a fixing portion of the magnetic circuit to the base and a resin layer with an adhesive layer formed thereon inserted between said magnetic circuit and said base,
   wherein the adhesive layer is formed on the resin layer except a portion thereof that overlaps the fixing portion of the magnetic circuit and is passed through the screw.

2. A disk drive as claimed in claim 1, wherein said magnetic circuit and said base are respectively fabricated from dissimilar metals.

3. A disk drive as claimed in claim 1, wherein said magnetic circuit comprises an upper magnet and upper magnetic yoke disposed above said actuator, a lower magnet and lower magnetic yoke disposed under said actuator, and a magnetic circuit connecting portion magnetically connecting between said upper magnetic yoke and said lower magnetic yoke.

4. A disk drive as claimed in claim 1, wherein said magnetic circuit fixing structure fastens at least one of lower and upper magnetic yokes of said magnetic circuit to said base via said cover with said screw.

5. For use in a disk drive comprising a disk enclosure having a base and a cover, a magnetic head, contained within said disk enclosure, configured to read and write information on an information storage disk, and a driving coil motor configured to move said magnetic head to a designated position on said disk by working in combination with an actuator on which said magnetic head is mounted and a magnetic circuit disposed in the vicinity of said actuator, a disk-drive magnetic circuit fixing method for fixing said magnetic circuit to said base by means of at least one screw, comprising:
   inserting a resin layer with an adhesive layer formed thereon between said magnetic circuit and said base, the adhesive layer being formed on the resin layer except a portion thereof that overlaps a fixing portion of the magnetic circuit; and
   fixing said magnetic circuit to said base by said screw.

* * * * *

UNITED STATES PATENT AND TRADEMARK OFFICE
CERTIFICATE OF CORRECTION

PATENT NO. : 8,130,466 B2
APPLICATION NO. : 12/331695
DATED : March 6, 2012
INVENTOR(S) : Hiroshi Nagata It is certified that error appears in the above-identified patent and that said Letters Patent is hereby corrected as shown below:

On the Face of the Patent:
(73) Assignee:

Delete "Toshiba Storage Device Corporation, Tokyo (JP)" and replace with "Kabushiki Kaisha Toshiba, Tokyo (JP)."

Signed and Sealed this
Fifth Day of June, 2012

David J. Kappos
*Director of the United States Patent and Trademark Office*